United States Patent
Lacaze et al.

(10) Patent No.: US 8,005,583 B2
(45) Date of Patent: Aug. 23, 2011

(54) METHOD AND DEVICE FOR DETERMINING THE AIR TURBULENCE LIKELY TO BE ENCOUNTERED BY AN AIRCRAFT

(75) Inventors: Isabelle Lacaze, Colomiers (FR); Jacques Rosay, Toulouse (FR); Jean-Pierre Daniel, Castelnau d'Estretefonds (FR)

(73) Assignees: Airbus France, Toulouse (FR); Airbus, Blagnac (FR)

( * ) Notice: Subject to any disclaimer, the term of this patent is extended or adjusted under 35 U.S.C. 154(b) by 1181 days.

(21) Appl. No.: 11/693,191

(22) Filed: Mar. 29, 2007

(65) Prior Publication Data

US 2007/0260366 A1 Nov. 8, 2007

(30) Foreign Application Priority Data

Mar. 30, 2006 (FR) ..................................... 06 02752

(51) Int. Cl.
G06F 7/70 (2006.01)
G06F 19/00 (2006.01)
G06G 7/00 (2006.01)
G06G 7/76 (2006.01)
(52) U.S. Cl. ........ 701/14; 340/902; 340/968; 73/170.02
(58) Field of Classification Search .................... 701/14; 340/902, 968; 73/170.02; 244/1 R, 75.1
See application file for complete search history.

(56) References Cited

U.S. PATENT DOCUMENTS

| | | | | |
|---|---|---|---|---|
| 5,541,591 | A * | 7/1996 | Bush | 340/968 |
| 6,177,888 | B1 * | 1/2001 | Cabot et al. | 340/968 |
| 6,456,226 | B1 | 9/2002 | Zheng et al. | |
| 6,539,291 | B1 * | 3/2003 | Tanaka et al. | 701/9 |
| 6,703,945 | B2 * | 3/2004 | Kuntman et al. | 340/961 |
| 6,828,922 | B1 * | 12/2004 | Gremmert et al. | 340/949 |
| 6,963,291 | B2 * | 11/2005 | Holforty et al. | 340/945 |
| 2003/0222795 | A1 * | 12/2003 | Holforty et al. | 340/968 |
| 2005/0278120 | A1 | 12/2005 | Manfred et al. | |
| 2006/0155432 | A1 * | 7/2006 | Brown | 701/14 |
| 2006/0244637 | A1 * | 11/2006 | Baranov et al. | 340/968 |

FOREIGN PATENT DOCUMENTS

EP 1008867 6/2000

OTHER PUBLICATIONS

E. Bass; "Towards a Pilot-Centered Turbulence Assessment and Monitoring System", Digital Avionics Systems Conference, 1999, Proceedings, 18th St. Louis, MO, USA Oct. 24-29, 1999, Piscataway, NJ, USA, IEEE, US vol. B.6-6 vol. 2, Oct. 24, 1999, pp. 6D3-1-7, XP010501253, ISBN: 0-7803-5749-3.

* cited by examiner

Primary Examiner — Tien Dinh
Assistant Examiner — Philip J Bonzell
(74) Attorney, Agent, or Firm — Dickinson Wright PLLC

(57) ABSTRACT

A method and device for determining the air turbulence likely to be encountered by a first aircraft may use a turbulence indication from a second aircraft so as to make and use a prediction of the impact of the turbulence on the first aircraft if it is located in a particular position.

19 Claims, 3 Drawing Sheets

METHOD AND DEVICE FOR DETERMINING THE AIR TURBULENCE LIKELY TO BE ENCOUNTERED BY AN AIRCRAFT

FIELD OF THE INVENTION

The present invention relates to a method and a device for determining the air turbulence that is likely to be encountered by an aircraft, in particular a transport airplane.

BACKGROUND OF THE RELATED ART

It is known that air turbulence corresponds to an agitation that is superimposed on the mean movement of the air and that is made up of continually changing disordered movements. The turbulence is encountered in or in the vicinity of the clouds (for example, in a stormy cloud where vertical currents in opposite directions coexist). There is also turbulence in clear sky, either close to the ground, or, primarily, at very high altitude in the vicinity of the jet streams.

It is also known that turbulence has, in recent years, been the primary cause of injuries in civil aviation. This is linked mainly to a negative load factor of the airplanes.

The airplanes are equipped with meteorological radars with which to create a map of precipitations, and this normally up to a distance of 100 nautical miles (approximately 185 kilometers) in front of the airplane, and detect particular risks such as the turbulences within a radius of 40 nautical miles (approximately 74 kilometers) and "windshear" type phenomena within a radius of 10 nautical miles (approximately 18 kilometers).

However, the meteorological radars can only detect turbulences, for which the drops of water have an adequate diameter. This is why the turbulences in clear sky (dry air masses) cannot be detected.

Furthermore, even the cloud masses cannot be totally detected. For example, a cumulonimbus which contains extremely dynamic and very rapid significant turbulent phenomena comprises, in its top part, ice crystals. The latter reflect little and are therefore almost invisible to a meteorological radar. Also, the turbulences associated with the top part of a cumulonimbus are almost undetectable.

SUMMARY OF THE INVENTION

The object of the present invention is to remedy these drawbacks. It relates to a method for determining any type of air turbulence that an aircraft is likely to encounter, a transport airplane for example.

To this end, according to the invention, said method is noteworthy in that:

a) on at least one first aircraft, the values of parameters relating to said first aircraft are measured, in a particular position of the latter in a flight;

b) on this first aircraft, said measured values are used to determine a turbulence indication which represents an estimation of the turbulence in said particular position, independently of the configuration of said first aircraft;

c) on said first aircraft, said particular position is also determined;

d) from said first aircraft, a set of information comprising at least said particular position and said corresponding turbulence indication are transmitted to at least one second aircraft;

e) on said second aircraft, said turbulence indication is used to predict the impact of the turbulence on said second aircraft if it is in said particular position; and f) this prediction is used on said second aircraft when the latter is in flight.

Thus, thanks to the invention, to be able to determine the turbulence existing in a particular position, the turbulence that a (first) aircraft that has recently been in that particular position has actually been subjected to is determined.

Furthermore, according to the invention, the turbulence in this particular position is determined, independently of the configuration (mass, elasticity of the fuselage, etc.) of said first aircraft. Thus, a turbulence indication is obtained that illustrates the turbulence actually encountered independently of the characteristics of the aircraft.

Furthermore, according to the invention, said air turbulence is evaluated on at least one second aircraft, by predicting the impact of this turbulence on this second aircraft if it is located in said particular position.

Advantageously, in the step b), a severity index relating to said turbulence is also determined, that is also transmitted to the second aircraft in the step d), by incorporating it in said set of information.

In this case, preferably:

in the step b), said severity index is compared with a predetermined value; and said set of information is transmitted to the second aircraft in the step d), only if said severity index is greater than said predetermined value.

In a first simplified variant of embodiment, in the step a), on said first aircraft, the values of the following parameters of said first aircraft are measured:

vertical acceleration;

angle of attack; and speed.

This first embodiment makes it possible to address mainly the cases of turbulence generating major vertical load factors, which represent most of the cases encountered.

Furthermore, in a second embodiment, in the step a), on said first aircraft, the values of the following parameters of said first aircraft are measured:

vertical acceleration;

angle of attack;

speed;

longitudinal acceleration;

transverse acceleration;

attitude;

side-slip; and ground speed.

It will be noted that said first aircraft, in particular a transport airplane, normally has on board sensors for measuring the values of all the abovementioned parameters (particularly for the piloting of the aircraft). Thus, implementing the present invention is inexpensive, particularly with regard to data acquisition.

Moreover, in a preferred embodiment, in the step b) the gradient of the wind in said particular position is calculated as turbulence information, which makes it possible to obtain a turbulence indication which is independent of the configuration of said first aircraft.

Furthermore, advantageously, in the step e), to make the prediction of the impact of the turbulence on the second aircraft, said turbulence indication is used to predict the maximum load factors that said second aircraft is likely to be subjected to if it is in a predetermined area about said particular position, taking into account the configuration of said second aircraft.

Thus, by comparing these maximum load factors, to which the second aircraft is likely to be subjected, with the maximum allowable load factors for this second aircraft, it is possible to know if said second aircraft is likely to pass, easily and safely, through the area of turbulence located about said particular position. In case of major risk to said second aircraft, it is then possible to modify the route of the latter.

Moreover, advantageously, in the step e), a severity index relating to said prediction of the impact of the turbulence is also determined.

Furthermore, advantageously, in the step e), a turbulence indication is taken into account (to make a prediction of the impact of the turbulence), only if the corresponding particular position is situated, to within a predetermined distance margin, on the path of said second aircraft.

Moreover, in a first embodiment, in the step f) all the data relating to the turbulence that is available on said second aircraft is stored, with a view in particular to subsequent use. Advantageously, in said step f):
   the turbulence indications from a plurality of first aircraft are stored, together with a history of the received turbulence indications; and
   based on the preceding data, a map of predicted turbulences is drawn up.
To this end, it will be noted that:
   the second aircraft can receive turbulence indications from several (first) aircraft, which enables it to have turbulence indications relating to several geographic points at a given instant; and
   said second aircraft can keep a history of the turbulence indications received, over a given period. This period is chosen for these indications to remain sufficiently reliable over this period. This makes it possible to have information on the turbulences passed through by each first aircraft, along the path of said second aircraft, over said period.
Consequently, by combining the latter two characteristics (spatial and temporal), a map of the turbulences can be formed on said second aircraft.

In a second embodiment, as a variant or complementing said first embodiment, in the step f), a map of at least one predicted turbulence is presented to the pilot of said second aircraft on at least one display screen.

In this case, preferably, said map of at least one predicted turbulence comprises:
   a plot of the path of said first aircraft, illustrated using a color code which is associated with a turbulence severity index; and
   an indication relating to an estimation of the movement of the turbulence.

In a third embodiment, as a variant or complementing one of said abovementioned first and second embodiments, in the step e), all the data relating to the turbulence that is available on the second aircraft is transmitted to a computer on this second aircraft to adapt the control of said second aircraft to any risk linked to the predicted turbulence.

Advantageously, in the step e), an estimation is also made of the movement of the turbulence. Preferably, an estimation of the degeneration (or of any increase) of the turbulence is also made.

Furthermore, in a particular embodiment, in the step d), said set of information is also transmitted to a receiving station located on the ground. Said set of information can, in particular, be used to update weather forecasts.

Naturally, in the context of the present invention, said steps a) to d) can be implemented on a plurality of first aircraft and/or said steps d) to f) can be implemented on a plurality of second aircraft. Furthermore, according to the invention, one and the same aircraft can, at two different moments, correspond respectively to said first aircraft on which said steps a) to d) are implemented and to said second aircraft on which said steps d) to f) are implemented.

The present invention also relates to a device for determining the air turbulence that is likely to be encountered by an aircraft, in particular a transport airplane.

According to the invention, said device is noteworthy in that it comprises:
   at least one measuring unit installed on a first aircraft, for measuring the values of parameters relating to said first aircraft in a particular position of the latter when flying;
   at least one first computation means which is installed on this first aircraft, for determining, using said measured values, a turbulence indication which represents an estimation of the turbulence in said particular position, independently of the configuration of said first aircraft;
   at least one measuring means which is installed on said first aircraft to determine said particular position;
   at least one data transmission system, comprising at least one data sending element which is installed on said first aircraft and at least one cooperating data receiving element which is installed on said second aircraft, and transmitting at least to said second aircraft from said first aircraft a set of information comprising at least said particular position and said corresponding turbulence indication;
   at least one second computation means which is installed on said second aircraft, to use said turbulence indication to make a prediction of the impact of the turbulence on said second aircraft if it is located in said particular position; and
   at least one usage means which is installed on said second aircraft, for using said prediction when the latter is in flight.

Preferably, said first computation means corresponds to a flight control computer of said first aircraft. Such a flight control computer has the advantage, usually, of already being present on the aircraft, of having links to sensors that make it possible to measure the abovementioned parameters used in accordance with the present invention and that are part of said measuring unit, and of having a sampling frequency that is adequate for these measurements.

In one particular embodiment, said data transmission system comprises at least one auxiliary data receiving element, which is installed in a station located on the ground.

Moreover, according to the invention, said usage means can comprise:
   at least one interface means comprising at least one display screen; and/or
   a computer for adapting the control of the second aircraft to any risk linked to the predicted turbulence.

In this case, preferably, said computer is a flight control computer of said second aircraft.

BRIEF DESCRIPTION OF THE DRAWINGS

The figures of the appended drawing will clearly show how the invention can be implemented. In these figures, identical references denote like elements.

DETAILED DESCRIPTION OF THE INVENTION

Figure 1:
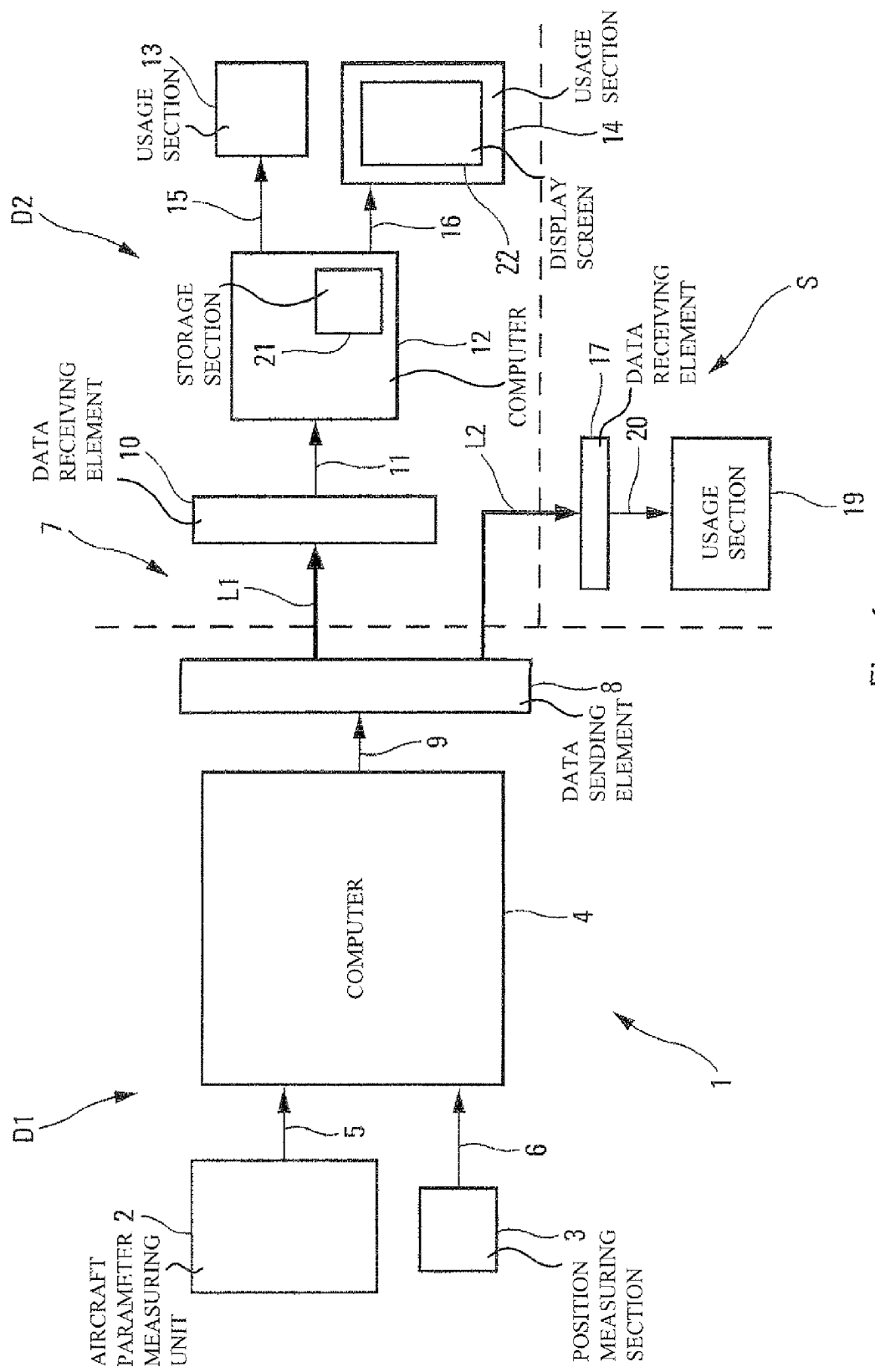
FIG. 1 is the block diagram of a device according to the invention.

The device 1 according to the invention and diagrammatically represented in FIG. 1 is intended to determine the air turbulence that is likely to be encountered by an aircraft.

According to the invention, said device 1 comprises:
- at least one measuring unit 2 which is installed on a first aircraft A1 (for example one of the aircraft A1A, A1B and A1C in the example of FIG. 2) and which comprises a plurality of sensors specified below, for measuring the values of parameters relating to said first aircraft A1, in a particular position of said aircraft A1 when the latter is in flight;
- at least one measuring means 3 which is installed on said aircraft A1 and which is intended to determine said particular position, that is, the position of the aircraft A1 at the moment when the measurements implemented by said measuring unit 2 are taken;
- at least one computation means 4 which is linked via links 5 and 6 respectively to said measuring unit 2 and to said measuring means 3, which is also installed on said aircraft A1, and which is constructed to use the values measured by said measuring unit 2 to determine a turbulence indication which represents an estimation of the turbulence in said particular position determined by said measuring means 3, and this independently of the configuration of said aircraft A1, as specified below;
- a data transmission system 7 which comprises at least one data sending element 8, which is installed on said aircraft A1 and which is linked via a link 9 to said computation means 4, and at least one data receiving element 10, which is installed on a second aircraft A2. This data transmission system 7 is constructed to transmit from said aircraft A1 to at least one second aircraft A2, for example in the form of electromagnetic waves as illustrated via a link L1, a set of information which comprises at least said particular position (measured by the measuring means 3) and the corresponding turbulence indication (determined by the computation means 4);
- at least one computation means 12 which is installed on said aircraft A2, which is linked via a link 11 to said data receiving element 10 and which is constructed to use the turbulence indication received from said aircraft A1 to make a prediction of the impact of the turbulence on said second aircraft A2 when the latter is located in the turbulence area existing in said particular position; and
- usage means 13 and 14 which are also installed on said aircraft A2, which are respectively linked via links 15 and 16 to said computation means 12, and which are constructed to use the prediction determined by said computation means 12 in a flight of said aircraft A2, as specified below.

The device 1 according to the invention can also comprise means that are installed on the ground, and in particular a data receiving element 17 which is part of the data transmission system 7 and which receives data from said data sending element 8, for example in the form of electromagnetic waves as illustrated by a link L2, and a usage means 19 which is linked via a link 20 to said data receiving element 17. Said means 19 and said element 17 are therefore installed in a station, for example an air control station, located on the ground.

In order to simplify the drawing, the elements of the device 1 according to the invention:
- that are installed on the aircraft A1, are highlighted by a reference D1;
- that are installed on the aircraft A2, are highlighted by a reference D2; and
- that are installed in the station located on the ground, are highlighted by a reference S.

In a preferred embodiment, said measuring unit 2 comprises sensors that already exist on the aircraft A1, and in particular accelerometers, gyrometers, pitch vanes and side-slip probes. This makes it possible to reduce the cost of the device 1 according to the invention.

In a simplified embodiment, said measuring unit 2 measures, on said aircraft A1, in the usual way, the values of the following parameters of said aircraft A1:
- vertical acceleration;
- angle of attack; and
- speed.

This first simplified embodiment makes it possible to focus on the cases of turbulence that generate major vertical load factors and that represent most of the cases encountered.

Furthermore, in a second preferred embodiment, said measuring unit 2 measures, on said aircraft A1, also in the usual way, the values of the following parameters of said aircraft A1:
- vertical acceleration;
- angle of attack;
- speed;
- longitudinal acceleration;
- transverse acceleration;
- attitude;
- side-slip; and
- ground speed.

The duly measured values are then transmitted by the measuring unit 2 to the computation means 4 which deduces from them a turbulence indication representing an estimation of the turbulence in the particular position concerned, and this independently of the configuration (mass, elasticity of the fuselage, etc.) of said aircraft A1. Preferably, said computation means 4 computes, for this purpose, the gradient of the wind (of coordinates Wx, Wy and Wz) encountered in said particular position as turbulence indication.

In a particular embodiment, said computation means 4 determines said coordinates Wx, Wy and Wz in the usual way, for example using the ground gradient, the air gradient, the ground speed, the air speed and the side-slip.

In a preferred embodiment, said computation means 4 is a flight control computer of the aircraft A1. This flight control computer has the advantage of already being linked to the abovementioned sensors and therefore being able to acquire the values of the parameters that are necessary (according to the present invention) for the turbulence computation. Furthermore, such a flight control computer has a sampling frequency that is adequate for the measurements.

Furthermore, said computation means 4 also determines a severity index (weak/severe) of the turbulence, which is associated with the measured wind gradient. This severity index can result from a spectral analysis based on load factor measurements or on wind estimations. In this case, this information can also be useful to the aircraft A1 to warn against a risk of aggravation of the turbulence.

In the context of the present invention, a turbulence indication can be transmitted to the aircraft A2:
- either in all cases where this indication is available;
- or only when the severity index associated with this turbulence indication is considered severe.

Moreover, the measuring means 3 can correspond to a navigation-type module, which in the usual way knows the actual position of the aircraft A1. The particular position (obtained using the measuring means 3) can be transmitted either to the computation means 4, or directly to the data sending element 8.

Naturally, the set of information that is determined on board said aircraft A1 is preferably transmitted to a plurality of second aircraft A2, in particular to all the aircraft that are located at no more than a predetermined distance from said aircraft A1 or to all the aircraft that are planning to pass no more than a predetermined distance away from said particular position.

In a particular embodiment, said data sending element 8 transmits said set of information (which comprises said particular position and said corresponding turbulence indication, and an indication of the measurement instant) in the form of a broadcast of the information to all the aircraft A2. Preferably, said data sending element 8 is an "ADS-B" type transmitter which exists on numerous airplanes and which is intended to transmit the airplane type, the position of the airplane and its speed in particular. Furthermore, the data receiving element 10 can be a "TCAS" type receiver which normally exists on the airplanes. The preceding characteristics make it possible to reduce the cost of the device 1 according to the invention.

Moreover, in a particular embodiment, to make the prediction of the impact of the turbulence on the aircraft A2, the computation means 12 uses said turbulence indication to predict the maximum load factors that said aircraft A2 is likely to be subject to if it is located in a predetermined area about said particular position, taking into account the configuration (mass, etc.) of said aircraft A2.

Said computation means 12 preferably sort the set of information received, to take into account only the information relating to a particular position which is compatible with the heading and the altitude of said aircraft A2 on which this computation means 12 is installed. More specifically, said computation means 12 takes into account a turbulence indication to make a prediction of the impact of the turbulence, only if the corresponding particular position is located, to within a predefined distance margin, on the planned path of said aircraft A2.

Said computation means 12 can also determine a severity index relating to the prediction of the impact of the turbulence on said aircraft A2. Furthermore, this computation means 12 can also comprise a means 21, integrated for example, for storing all the data relating to the turbulence that is available on said aircraft A2.

This information can also be sent to an interface means 14 representing a man/machine interface which is available to the pilot of the aircraft A2 and which comprises in particular a screen 22 for displaying at least some of this information. Thus, the pilot can be informed as appropriate of a risk of turbulence. He can then implement the appropriate means. In a particular embodiment, said interface means 14 presents to the pilot of said aircraft A2, on the display screen 22, for example a normal navigation screen of the ND (Navigation Display) type which is located in the cockpit, a map of at least one predicted turbulence.

The pilot can thus be informed of turbulence predictions, via a display on one of the pages of the navigation screen. It is also possible to provide for indicating the procedures (seatbelts fastened, etc.) to be implemented in cases of severe turbulence. Such a severe turbulence indication can also be complemented by a message on another screen, for example of "ECAM" type, intended to remind the pilot of the procedure to follow or intended to indicate to him the level of load factor to which he is likely to be subjected, the turbulence measurement time and its position to make an analysis according to the wind streams.

Figure 2:
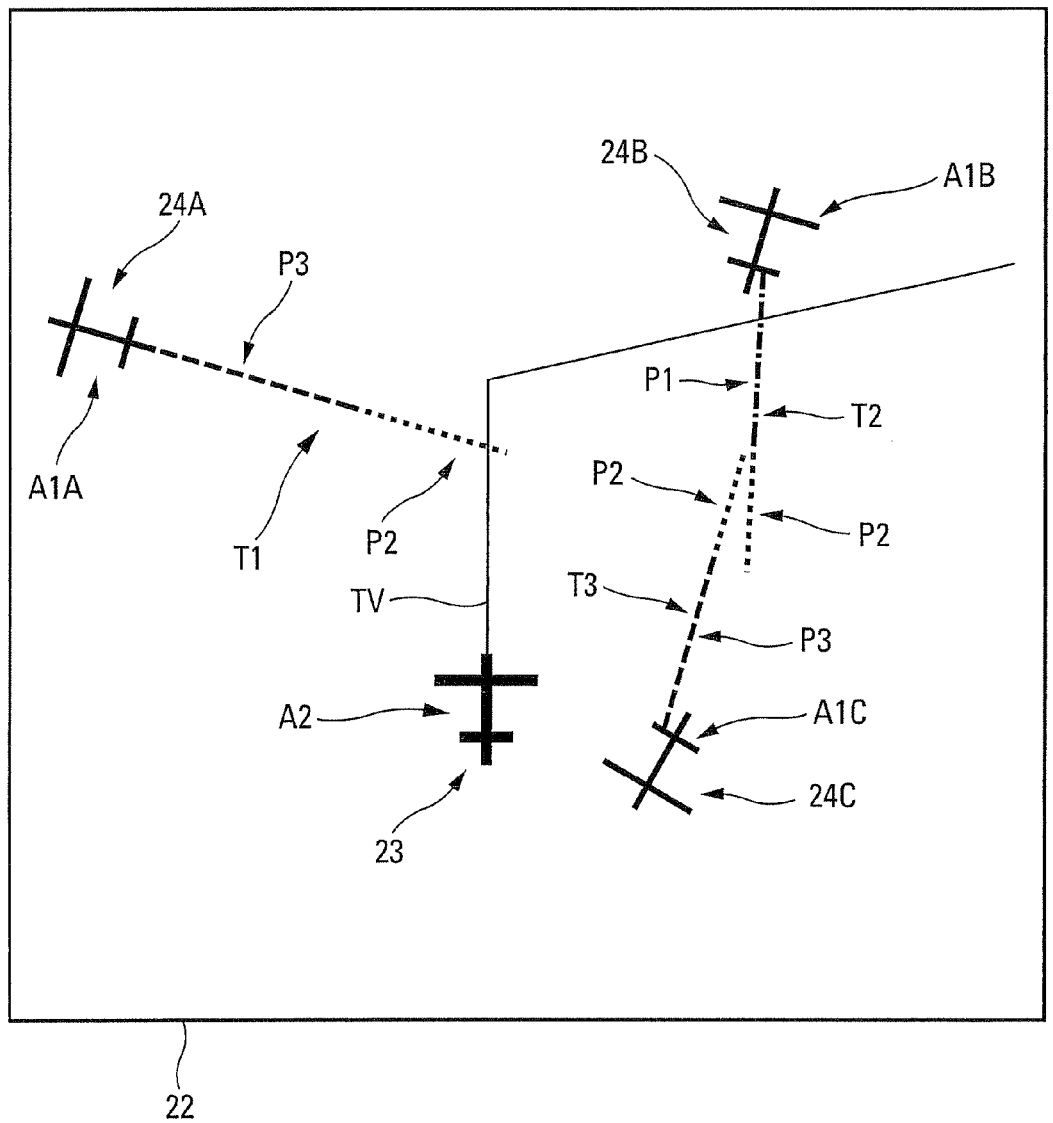
FIG. 2 diagrammatically shows a display possibility likely to be implemented on a second aircraft, taking into account the turbulence determined according to the present invention.

In a preferred embodiment, the turbulences are indicated on the display screen 22, for example a navigation screen of the aircraft A2, in the form of plots of the paths of a plurality of first aircraft A1 which are located in the vicinity of the flight path TV of this aircraft A2 which is illustrated by a particular symbol 23, as represented in FIG. 2. The plots T1, T2, T3 of the paths of said first aircraft A1 (namely A1A, A1B and A1C), whose respective current positions are illustrated by symbols 24A, 24B and 24C, are represented using a color code which is associated with a turbulence severity index. This color code can comprise:
 a red color, if the risk associated with the turbulence is high;
 an orange color, if the risk is moderate; and
 a green color, if the risk is low.

FIG. 2 highlights this color code using a particular plot graphic system for said plots T1, T2 and T3, which comprise some of the following parts: a part P1 (associated, for example, with the red color), a part P2 (associated, for example, with the orange color), and a part P3 (associated, for example, with the green color).

On the map presented to the pilot, it is also possible to give a trend indication relating to the estimation of the movement of the turbulence.

It will be noted that the computation means 12 is able to make an estimation of the movement of the turbulence, when processing the received data. For this, the aircraft A1 can make an estimation of the wind and transmit it to the aircraft A2. The latter also makes an estimation of the wind. The movement of the turbulence can then be deduced, by making an intensity and orientation interpolation between these two wind estimations. This indication relating to the estimation of the movement of the turbulence can be displayed on a navigation screen or on an "ECAM" type screen.

The information generated by the computation means 12 can also be transmitted to a computer 13 so that the control of the aircraft A2 can be adapted to the risk associated with the turbulence. For this, it can implement an avoidance of the turbulence area if the predicted turbulence appears to be severe, or, if necessary, adjust the control gains of the aircraft A2 to minimize the acquired load factor. Preferably, said computer 13 is a flight control computer of the aircraft A2.

Figure 3:
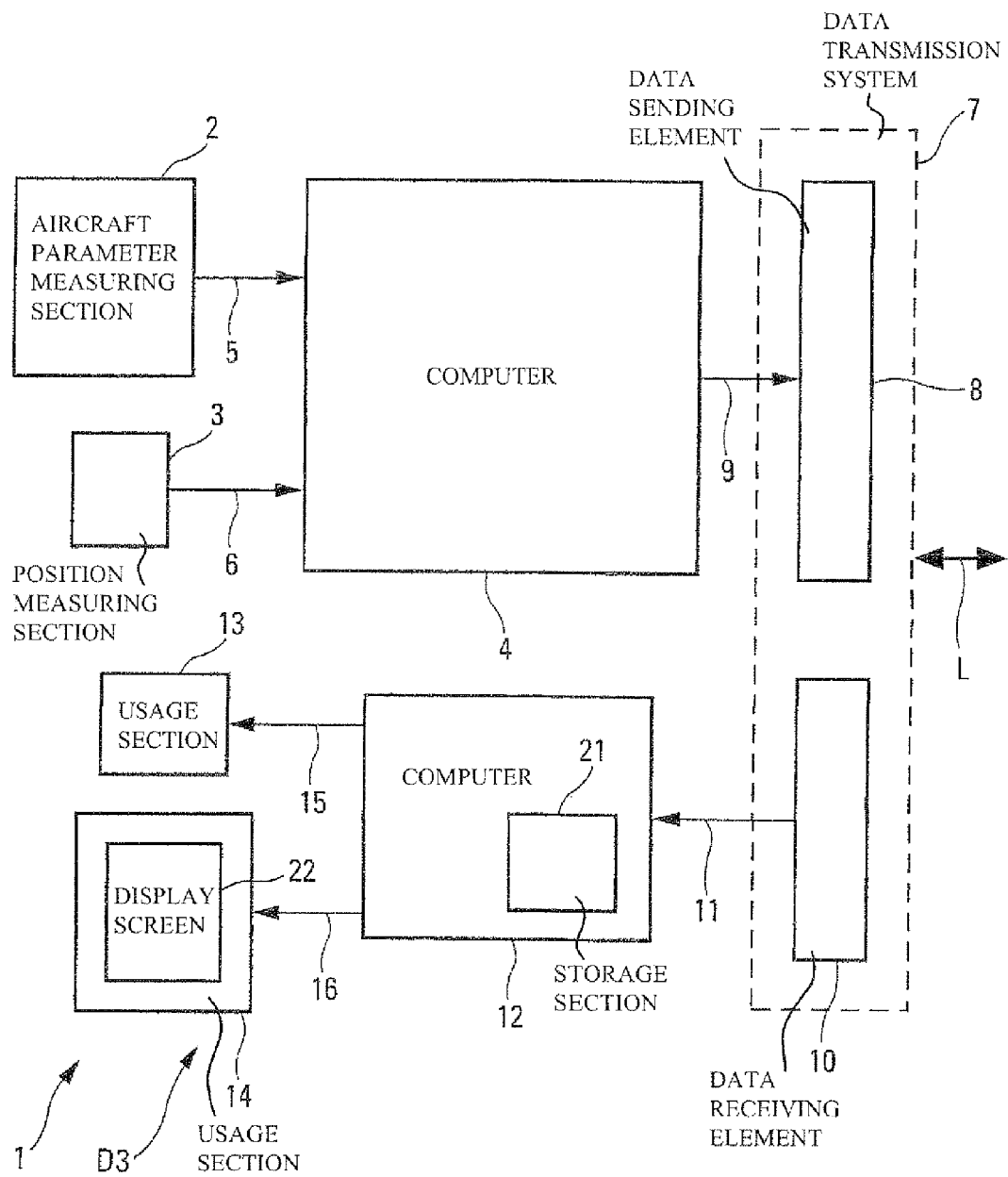
FIG. 3 shows a particular device according to the invention, all the elements of which are installed on one and the same aircraft.

Naturally, a receiving aircraft A2 can in turn become a sending aircraft A1, to relay information to other aircraft located at a distance greater than the range from the first sending aircraft. For this, such an aircraft which corresponds, at two different instants, respectively to a first sending aircraft and to a second receiving aircraft, comprises the set D3 of elements that are represented in FIG. 3, namely the set of elements D1 and D2 in FIG. 1. The corresponding two-way data transmission link is highlighted by a double arrow L in this FIG. 3.

The invention claimed is:

1. A method for determining the air turbulence likely to be encountered by an aircraft, whereby:
 a) on at least one first aircraft, measuring the values of parameters relating only to said first aircraft, in a particular position of the first aircraft in a flight;
 b) on this first aircraft, employing said measured values to determine an estimation indication which represents an indication of the turbulence in said particular position, independently of the configuration of said first aircraft;
 c) on said first aircraft, determining said particular position;
 d) from said first aircraft, transmitting a set of information comprising at least said particular position and said corresponding turbulence indication to at least one second aircraft, wherein, in addition:

d) said set of information is transmitted directly from said first aircraft to said second aircraft;

e) on said second aircraft, said turbulence indication is used to predict the impact of the turbulence on said second aircraft if it is in said particular position, by using said turbulence indication to predict the maximum load factors that said second aircraft is likely to be subjected to if it is in a predetermined area around said particular position, taking into account the configuration of said second aircraft; and f) this prediction of the turbulence impact is used on said second aircraft when the second aircraft is in flight.

2. The method as claimed in claim 1, wherein, in the step a), on said first aircraft, the values of the following parameters of said first aircraft are measured:
vertical acceleration;
angle of attack; and
speed.

3. The method as claimed in claim 1, wherein, in the step a), on said first aircraft the values of the following parameters of said first aircraft are measured:
vertical acceleration;
angle of attack;
speed;
longitudinal acceleration;
transverse acceleration;
attitude;
side-slip; and
ground speed.

4. The method as claimed in claim 1, wherein, in the step b), a gradient of the wind in said particular position is calculated as turbulence information.

5. The method as claimed in claim 1, wherein, in the step e), a severity index relating to said prediction of the impact of the turbulence is also determined.

6. The method as claimed in claim 1, wherein, in the step e), the turbulence indication is taken into account to make the prediction of the impact of the turbulence, only if the corresponding particular position is situated, to within a predefined distance margin, on the path of said second aircraft.

7. The method as claimed in claim 1, wherein, in the step e), all data relating to the turbulence that is available on the second aircraft is transmitted to a computer on this second aircraft to adapt the control of said second aircraft to any risk linked to the predicted impact of the turbulence.

8. The method as claimed in claim 1, wherein, in the step e), an estimation is made of the movement of the turbulence.

9. The method as claimed in claim 1, wherein, in the step d), said set of information is transmitted to a receiving station located on the ground.

10. The method as claimed in claim 1, wherein the steps a) to d) are implemented on a plurality of first aircraft.

11. The method as claimed in claim 1, wherein the steps d) to f) are implemented on a plurality of second aircraft.

12. The method as claimed in claim 1, wherein one and the same aircraft can, at two different moments, correspond respectively to said first aircraft on which said steps a) to d) are implemented and to said second aircraft on which said steps d) to f) are implemented.

13. The method as claimed in claim 1, wherein, in the step b), a severity index relating to said turbulence is also determined, that is also transmitted to the second aircraft in the step d), by incorporating it in said set of information.

14. The method as claimed in claim 13, wherein:
in the step b), said severity index is compared with a predetermined value; and
said set of information is transmitted to the second aircraft in the step d), only if said severity index is greater than said predetermined value.

15. The method as claimed in claim 1, wherein, in the step f), all the data relating to the turbulence that is available on said second aircraft is stored.

16. The method as claimed in claim 15, wherein, in said step f):
turbulence indications from a plurality of first aircraft are stored, together with a history of the received turbulence indications; and
based on the preceding data, a map of predicted turbulences is drawn up.

17. The method as claimed in claim 1, wherein, in the step f), a map of at least one predicted turbulence is presented to the pilot of said second aircraft on at least one display screen.

18. The method as claimed in claim 17, wherein said map of at least one predicted turbulence comprises:
a plot of the path of said first aircraft, illustrated using a color code which is associated with a turbulence severity index; and
an indication relating to an estimation of the movement of the turbulence.

19. A method for determining the air turbulence likely to be encountered by an aircraft, whereby:

a) on at least one first aircraft, the values of parameters relating only to said first aircraft are measured, in a particular position of the first aircraft in a flight;

b) on this first aircraft, said measured values are used to determine an estimation indication which represents an indication of the turbulence in said particular position, independently of the configuration of said first aircraft;

c) on said first aircraft, said particular position is also determined;

d) from said first aircraft, a set of information comprising at least said particular position and said corresponding turbulence indication are transmitted to at least one second aircraft, wherein, in addition:

d) said set of information is transmitted directly from said first aircraft to said second aircraft;

e) on said second aircraft, said turbulence indication is used to predict the impact of the turbulence on said second aircraft if it is in said particular position, by using said turbulence indication to predict the maximum load factors that said second aircraft is likely to be subjected to if it is in a predetermined area around said particular position, taking into account the configuration of said second aircraft; and f) this prediction of the turbulence impact is used on said second aircraft when the second aircraft is in flight, and wherein in the step e), said maximum load factors that said second aircraft is likely to be subjected to are compared with the maximum allowable load factors for this second aircraft.

* * * * *